United States Patent
Laible

(10) Patent No.: US 11,124,338 B1
(45) Date of Patent: Sep. 21, 2021

(54) OVERMOLDED VALVE FOR A LIQUID CONTAINER

(71) Applicant: Rodney Laible, Omaha, NE (US)

(72) Inventor: Rodney Laible, Omaha, NE (US)

( * ) Notice: Subject to any disclaimer, the term of this patent is extended or adjusted under 35 U.S.C. 154(b) by 0 days.

(21) Appl. No.: 17/232,242

(22) Filed: Apr. 16, 2021

Related U.S. Application Data

(63) Continuation-in-part of application No. 17/217,267, filed on Mar. 30, 2021.

(51) Int. Cl.
*F16K 15/02* (2006.01)
*B65D 47/30* (2006.01)
*F16K 17/04* (2006.01)
*B65D 55/08* (2006.01)

(52) U.S. Cl.
CPC ......... *B65D 47/30* (2013.01); *B65D 55/0827* (2013.01); *F16K 17/044* (2013.01)

(58) Field of Classification Search
CPC ...... F16K 15/025; F16K 15/026; F16K 15/04; F16K 17/044; F16K 15/18; F16K 15/028; B67D 3/0025; B67D 47/30; B67D 55/0827
See application file for complete search history.

(56) References Cited

U.S. PATENT DOCUMENTS

| | | | | |
|---|---|---|---|---|
| 3,386,470 | A | * | 6/1968 | Goda ............... F16K 15/026 137/512 |
| 5,010,916 | A | * | 4/1991 | Albrecht ............ F16K 15/028 137/454.2 |
| 6,945,432 | B2 | | 9/2005 | Laible |
| 6,945,433 | B2 | | 9/2005 | Laible |
| 6,986,443 | B2 | | 1/2006 | Laible |
| 7,832,599 | B2 | | 11/2010 | Laible |
| 7,841,492 | B2 | | 11/2010 | Laible |
| 8,066,157 | B2 | | 11/2011 | Laible |
| 8,220,665 | B2 | | 7/2012 | Laible |
| 8,671,976 | B2 | * | 3/2014 | Park ............... F04B 27/1018 137/543.19 |
| 9,004,099 | B2 | * | 4/2015 | Kim ............... F16K 15/06 137/543.19 |
| 10,618,710 | B1 | | 4/2020 | Laible |
| 10,899,506 | B2 | | 1/2021 | Laible |

\* cited by examiner

Primary Examiner — P. Macade Nichols
(74) Attorney, Agent, or Firm — Dennis L. Thomte; Thomte Patent Law Office LLC

(57) ABSTRACT

An overmolded valve is provided for use in a container having a throat. The valve is inserted into the throat of the container and prevents liquid from flowing from the container during shipment or storage. When the container is inverted for use with a dosing and/or dispensing apparatus, the valve remains closed until it is opened by an upward force to permit liquid to flow from the container, by gravity, to the dosing and/or dispensing apparatus. The valve closes when the upward force is removed. A pair of plastic semi-helical springs urge the valve to the closed position.

7 Claims, 8 Drawing Sheets

OVERMOLDED VALVE FOR A LIQUID CONTAINER

CROSS REFERENCE TO RELATED APPLICATION

This is a Continuation-In-Part Application of application Ser. No. 17/217,267 filed Mar. 30, 2021, entitled OVERMOLDED VALVE FOR A LIQUID CONTAINER.

BACKGROUND OF THE INVENTION

Field of the Invention

This invention relates to an overmolded valve which is inserted into the throat of a liquid container. More particularly, this invention relates to an overmolded valve which is inserted into the throat of a liquid container while the liquid container is in an upright position to prevent liquid from leaking from the container during transport and storage of the container. Even more particularly, this invention relates to an overmolded valve which may be opened to permit liquid to flow from the container by gravity when the container is inverted. Even more particularly, this invention relates to an overmolded valve which includes a pair of semi-helical plastic springs which yieldably urge the valve to its closed position.

Description of the Related Art

Applicant has received several patents relating to dosing and/or dispensing systems, such as U.S. Pat. Nos. 6,945,432; 6,945,433; 6,986,433; 7,832,598; 7,841,492; 8,066,157; 8,220,665; 10,618,710 and 10,899,508, the disclosures of which are incorporated herein by reference thereto to complete this disclosure if necessary.

In most of the above patents, a throat plug assembly, including a normally closed valve, is inserted into the throat of the container to prevent liquid from flowing from the container when the container was shipped or stored. Many of the above patents permitted liquid to flow from the container by gravity when the container was inverted, and the valve was opened. The throat plug assemblies of Applicant's patents set forth above performed in an excellent manner and were commercially successful. Applicant has developed a unique valve which is completely comprised of recyclable plastic and which is less expensive to manufacture and easier to assemble. Other features of the instant invention will be set forth in detail hereinafter.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A normally closed valve is provided for use in the throat of a liquid container. When the container is being shipped or stored, the valve of this invention prevents liquid from leaking from the container. When the container is inverted for use with a dispensing and/or dosing apparatus, the normally closed valve member thereof, upon being subjected to an upward force, opens to permit liquid to flow, by gravity, downwardly therethrough.

The valve of this invention will be described as being in an inverted position when the liquid container is in an inverted position.

The valve of this invention includes a generally cylindrical plastic substrate member having an upper end, a lower end, an inner side and an outer side. The substrate member has a ring-shaped cylindrical wall member, having inner and outer sides, at the lower end thereof which defines a liquid discharge opening. A first annular lip extends outwardly from the lower end of the cylindrical wall. A second annular lip extends outwardly from the cylindrical wall at the upper end of the cylindrical wall. The first lip, the cylindrical wall and the second lip are overmolded with a plastic material.

The substrate member has a plurality of radially spaced-apart first vent openings formed therein above the upper end of the cylindrical wall member. The substrate member also has a plurality of radially spaced-apart second vent openings formed therein above the first radially spaced-apart first vent openings. A plurality of radially spaced-apart retainers are provided on the inner side of the substrate member at the upper end of the substrate member.

The valve of this invention also includes a plastic valve member, having upper and lower ends, which is snap-fitted into the interior of the substrate member. The valve member includes a disc-shaped valve plate at the lower end thereof. The periphery of the valve plate has an upwardly extending portion. A lower ring, having upper and lower ends, extends upwardly from the upwardly extending portion of the valve plate. A first semi-helical plastic spring, having lower and upper ends, has its lower end molded with the upper end of the lower ring and extends upwardly therefrom. A second semi-helical plastic spring, having upper and lower ends, has its lower end molded with the upper end of the lower ring and extends upwardly therefrom. The lower ends of the first and second semi-helical plastic springs are spaced-apart 180 degrees. The upper ends of the first and second semi-helical plastic springs are molded to a horizontally disposed upper ring and are spaced-apart 180 degrees.

The valve member is inserted downwardly into the upper end of the substrate member until the upper ring member is positioned below the retainers on the inner side of the substrate member with the retainers preventing upward movement of the valve member with respect to the substrate member.

When the container is inverted, the plastic springs maintain the valve plate in a closed position with respect to the liquid discharge opening of the substrate member. When an upward force is applied to the valve plate, the valve plate moves upward against the force of the plastic springs to open the liquid discharge opening so that liquid may flow downwardly, by gravity through the liquid discharge opening to a dosing apparatus, or dispensing apparatus, or some other equipment.

The valve of this invention is comprised completely of a plastic recyclable material and is of two-piece construction.

A principal object of the invention is to provide an overmolded valve for a liquid container.

A further object of the invention is to provide an overmolded valve for a liquid container which is sustainable in use.

A further object of the invention is to provide an overmolded valve for a liquid container with the valve and the substrate member thereof being comprised entirely of recyclable plastic material.

A further object of the invention is to provide a device of the type described which utilizes less components than other valves in the art.

A further object of the invention is to provide an overmolded valve for a liquid container which is less expensive than other valves in the art.

A further object of the invention is to provide an overmolded valve for a liquid container which is easy to manufacture and assemble.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
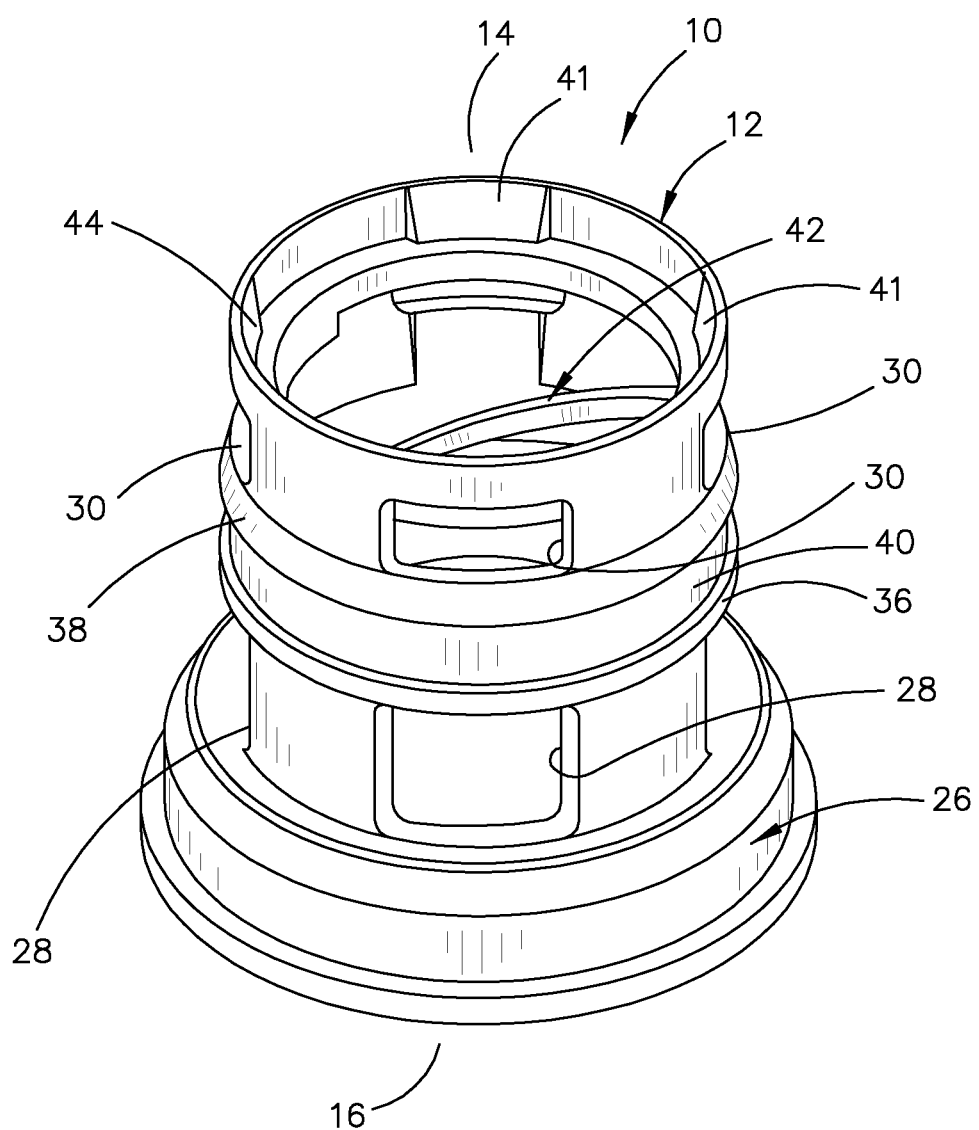
FIG. 1 is a perspective view of the valve of this invention.
Figure 2:
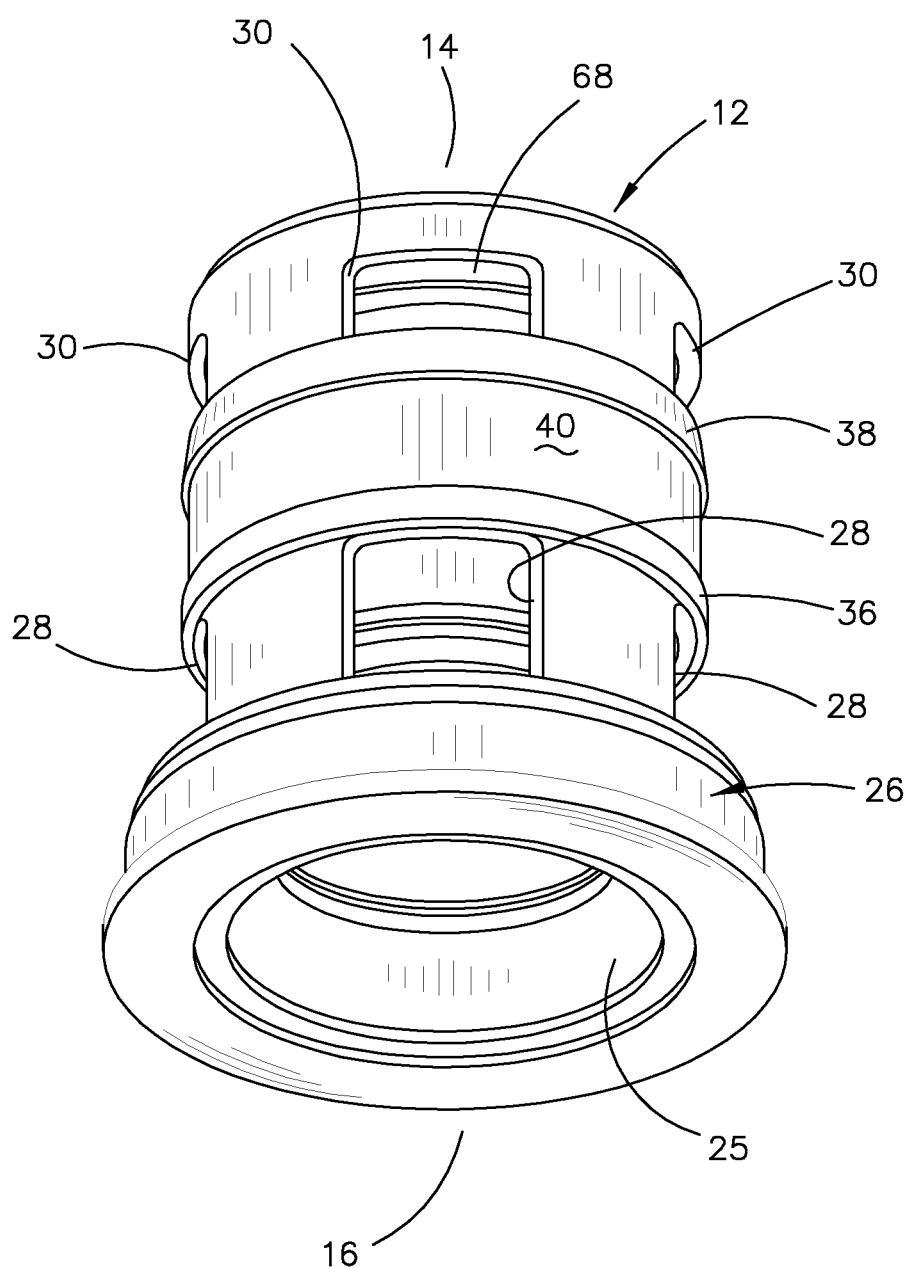
FIG. 2 is a lower perspective view of the valve of this invention.
Figure 3:
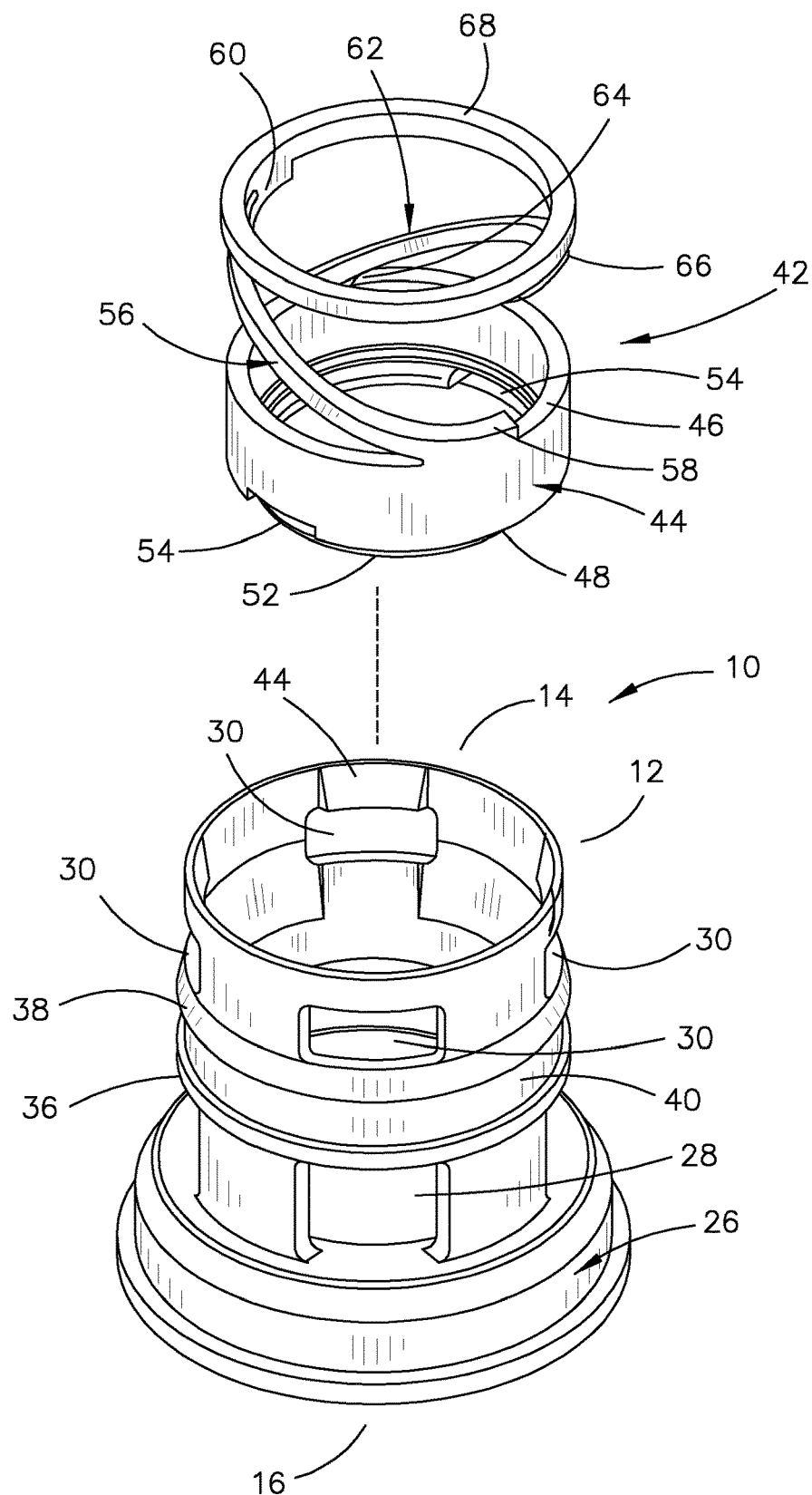
FIG. 3 is an exploded perspective view of the valve of this invention.
Figure 4:
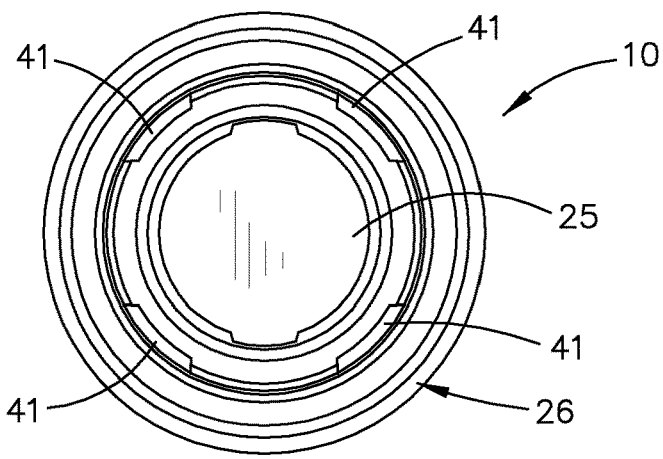
FIG. 4 is a top view of the valve of this invention.
Figure 5:
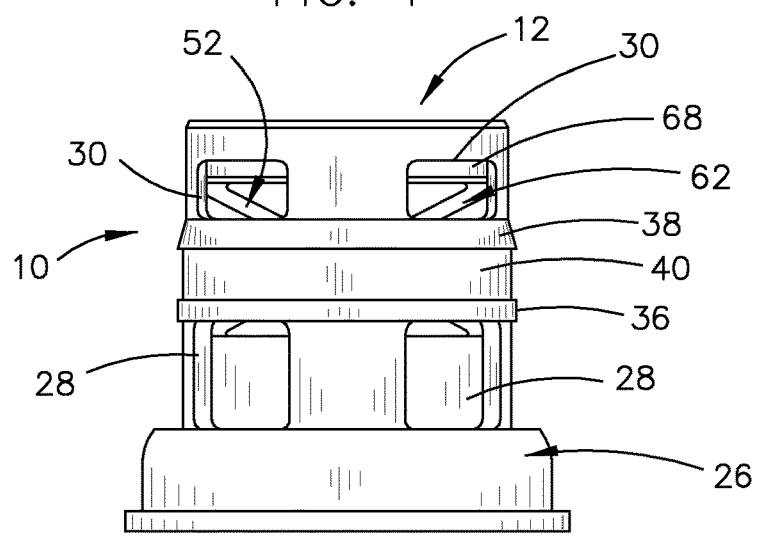
FIG. 5 is a side view of the valve of this invention.
Figure 6:
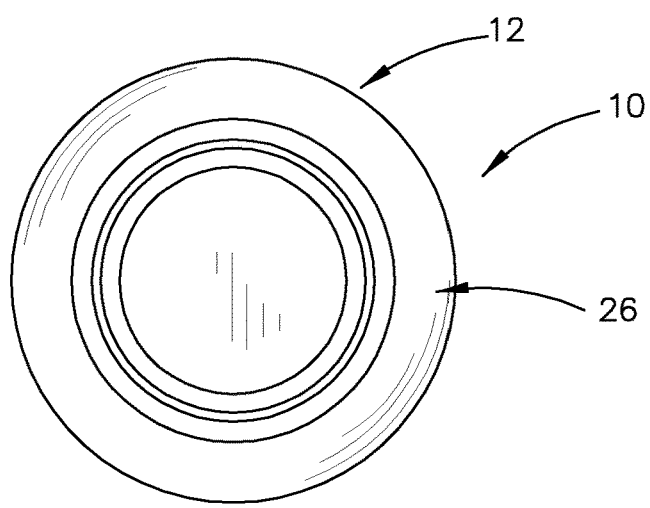
FIG. 6 is a bottom view of the valve of this invention.
Figure 7:
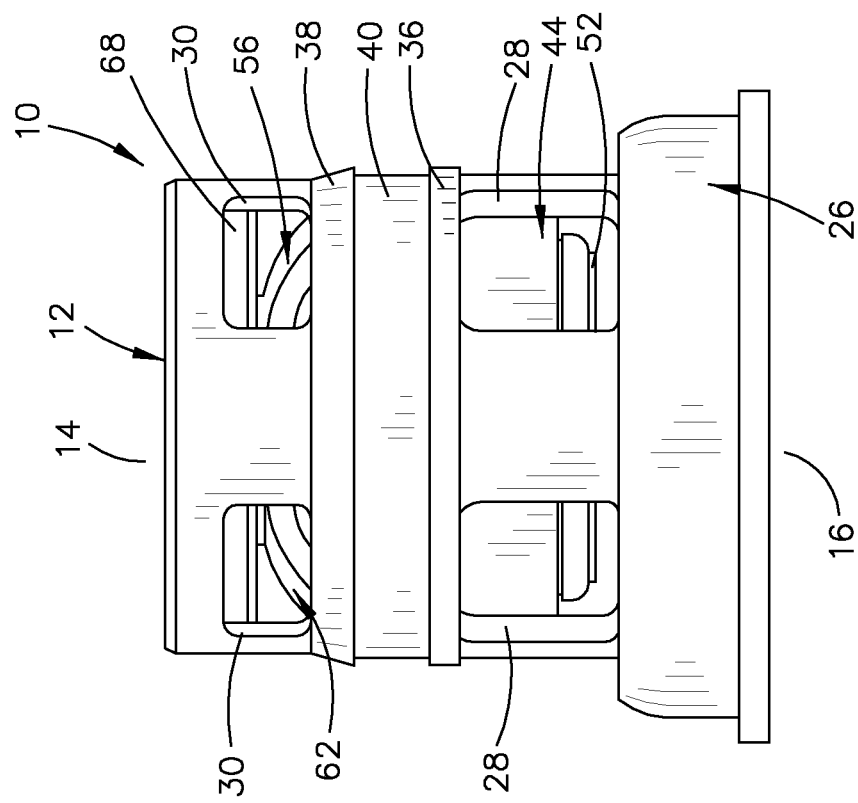
FIG. 7 is a side view of the valve of this invention.
Figure 8:
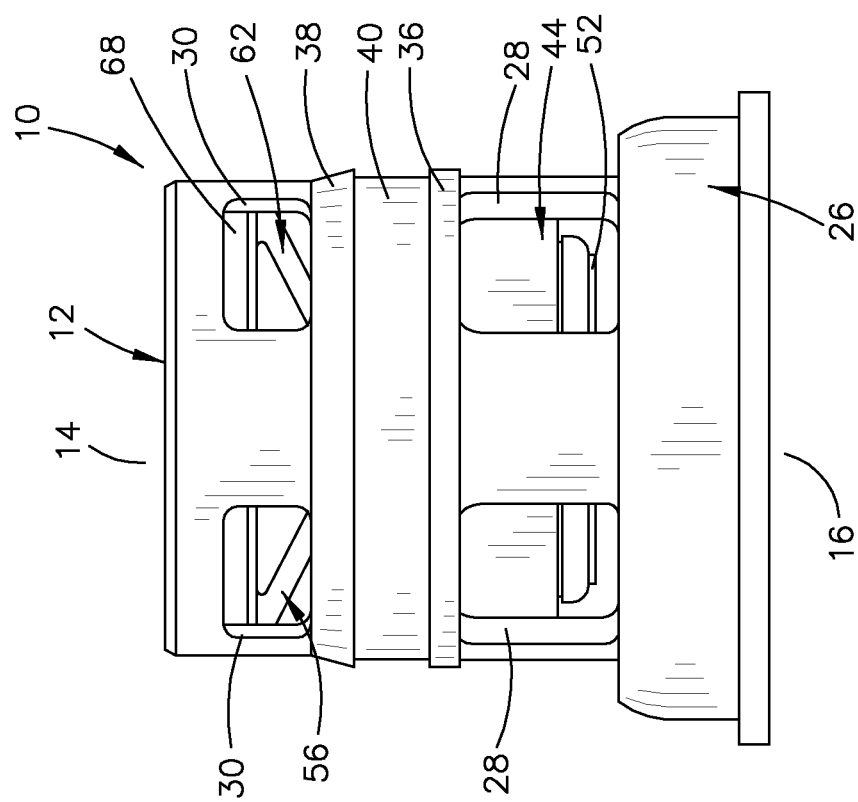
FIG. 8 is a side view of the valve of this invention.
Figure 9:
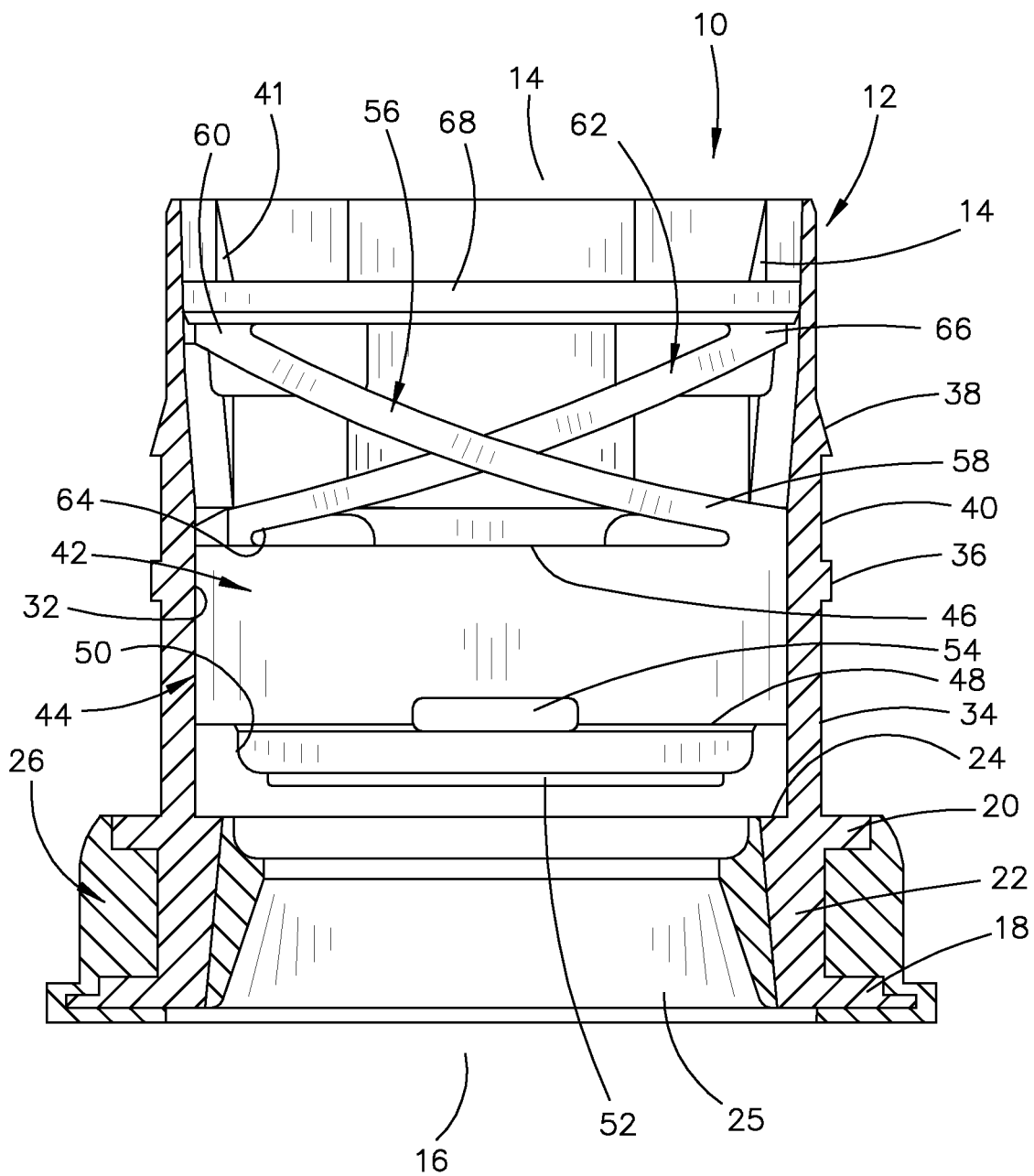
FIG. 9 is a sectional view of the valve of this invention.
Figure 10:
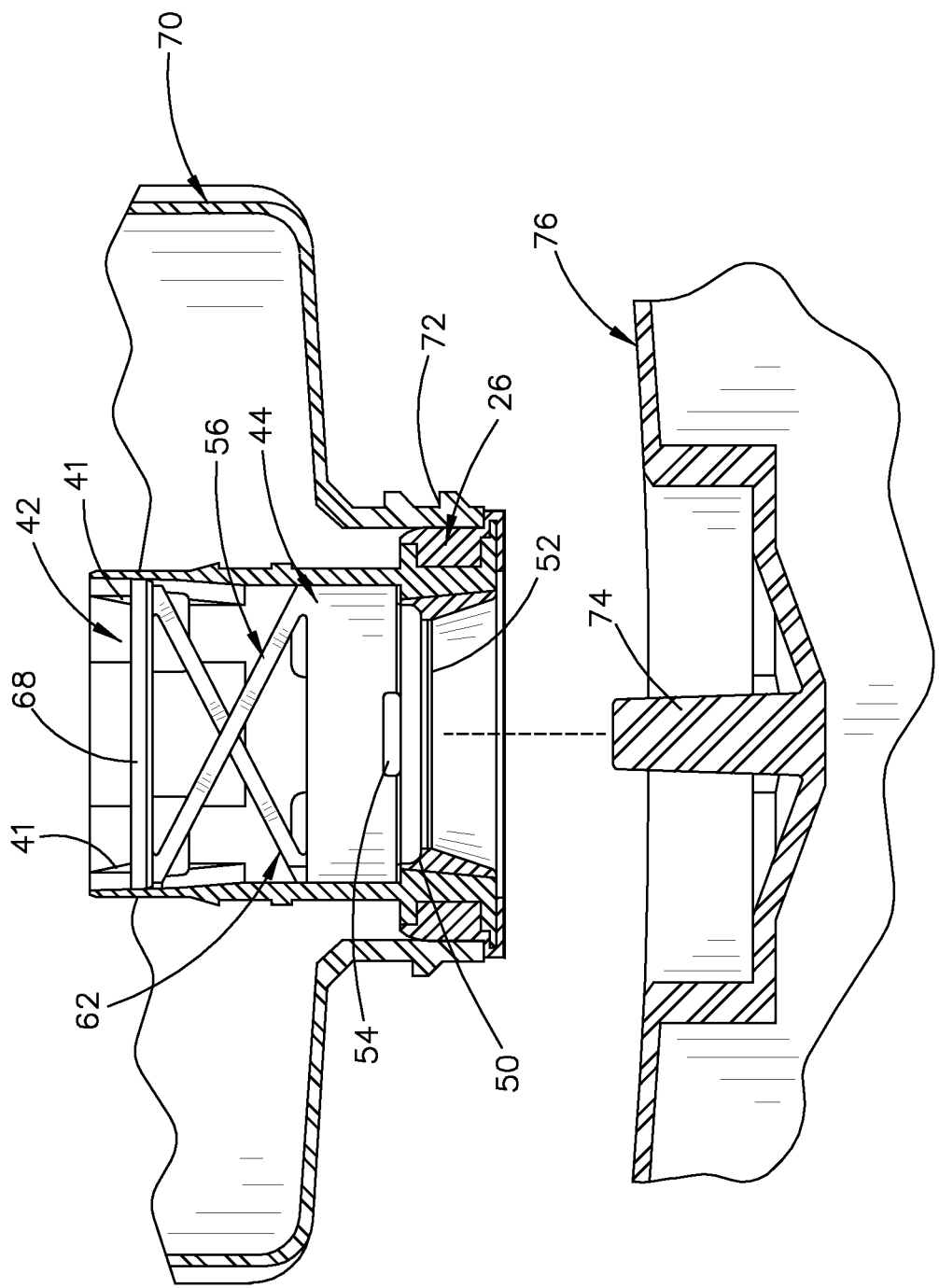
FIG. 10 is a sectional view illustrating the valve of this invention mounted in the throat of a liquid container with the valve in a closed position.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The valve of this invention is referred to with the reference numeral 10. Valve 10 is designed to be inserted into the throat of a liquid container such as shown and described in U.S. Pat. Nos. 7,832,598; 8,066,157; 8,220,665; 10,618,710 and 10,899,508, the disclosures of which are incorporated herein by reference thereto to complete this disclosure if necessary. The valve 10 will be shown in the inverted position as it would appear when the liquid container is in the gravity flow inverted position.

Valve 10 includes a generally cylindrical plastic substrate member 12 having an upper end 14 and a lower end 16. Annular lips 18 and 20 extend outwardly from a cylindrical wall 22 in a vertically spaced-apart manner. The upper end of cylindrical wall 22 defines a shoulder 24 and a liquid discharge opening 25. The numeral 26 refers to overmolding plastic which extends over and around lip 18 and lip 20. The overmolding plastic 26 also extends around the inner and outer sides of wall 22.

Substrate member 12 has four radially spaced-apart vent openings 28 formed therein above shoulder 24. Substrate member 12 also has four radially spaced-apart vent openings 30 formed therein below the upper end 16 of substrate member 12. As seen, the vent openings 28 are rectangular-shaped with the length thereof being vertically disposed. As also seen, the vent openings 30 are rectangular-shaped with the length thereof being horizontally disposed. Substrate member 12 will be described as having an inner side 32 and an outer side 34.

Substrate member 12 has an annular ring 36 molded therewith which extends outwardly from the outer side 34 thereof. A tapered ring 38 is molded with substrate 12 and extends outwardly from the outer side 34 thereof. The rings 36 and 38 define a recess 40 therebetween so as to receive a lug ring such as shown in U.S. Pat. No. 10,618,710 and identified by the reference numeral 102 therein. The inner side of substrate member 12, at the upper end thereof, has four radially spaced-apart retainers 41 extending inwardly therefrom.

The numeral 42 refers to the plastic valve member of this invention. Valve member 42 includes a horizontally disposed ring 44 having an upper end 46 and a lower end 48. A ring-shaped shoulder 50 extends downwardly and inwardly from the lower end 48 of ring 44. A disc-shaped valve plate 52 is joined to the lower end of shoulder 50. The lower end 48 of valve member 42 has a pair of openings 54 formed therein.

Valve member 42 includes a first semi-helical plastic spring 56 having a lower end 58 and an upper end 60. The lower end 58 of spring 56 is molded to the upper end 46 of ring 44. Valve member 42 also includes a second semi-helical plastic spring 62 having a lower end 64 and an upper end 66. The lower end 64 of spring 62 is molded to the upper end 46 of ring 44. The lower ends 58 and 64 of springs 56 and 62 respectively are spaced-apart 180 degrees. The upper ends 60 and 66 of springs 56 and 62 respectively are molded to a horizontally disposed ring 68. The upper ends 60 and 66 of springs 56 and 62 respectively are spaced-apart 180 degrees.

Figure 11:
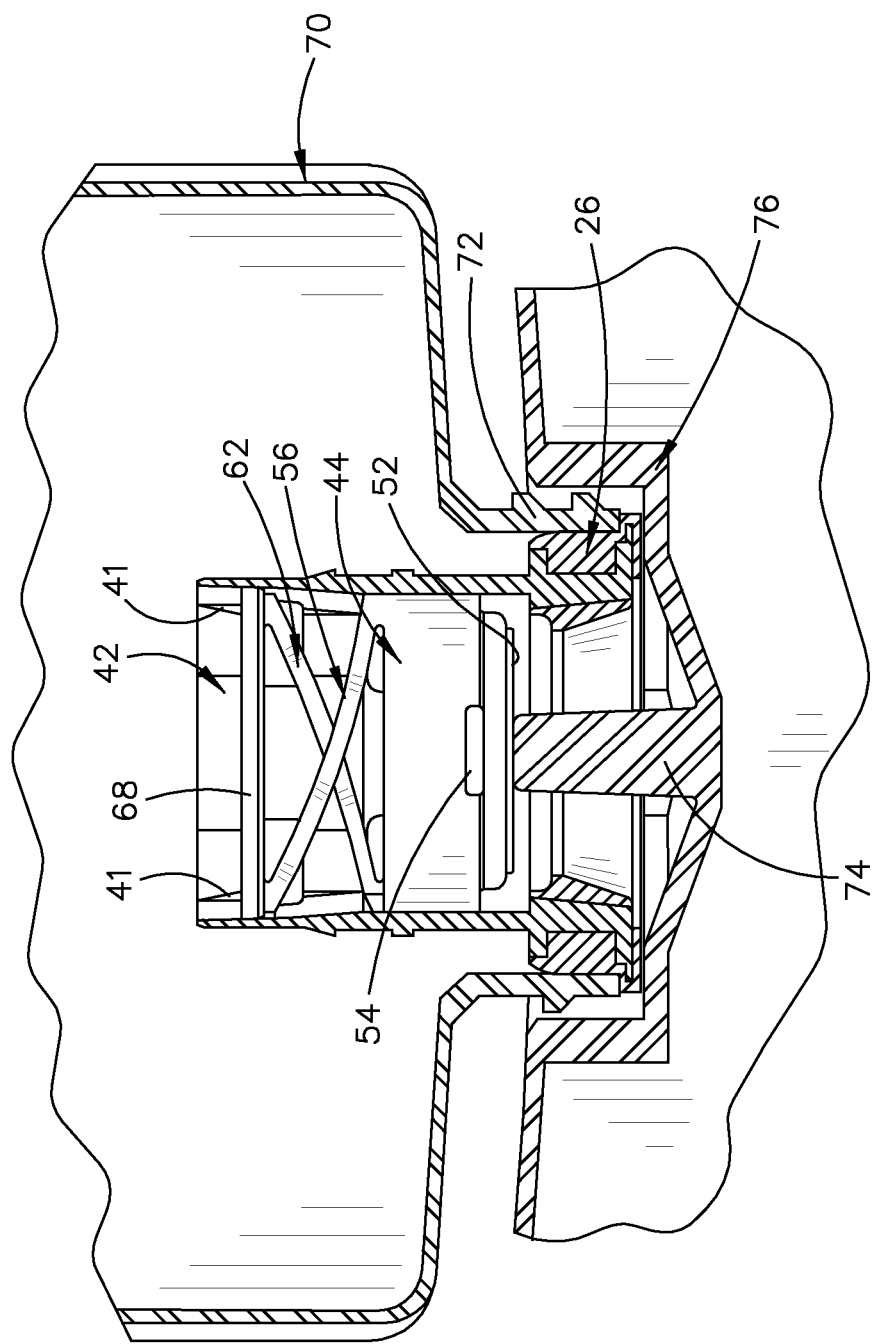
FIG. 11 is a sectional view similar to FIG. 10 except that the valve has been moved upwardly to an open position by an actuator.

The numeral 70 refers to a liquid container having a throat 72 extending therefrom. The valve 10 is inserted into the throat 72. The numeral 74 refers to an actuator which is part of an apparatus 76 which may be a dosing or dispensing apparatus. In use, the valve 10 is first inserted into the throat 72 of the container 70 while the container 70 is in the upright shipping or storage position. Valve 10 is normally closed while in the upright position due to the fact that the plastic springs 56 and 62 yieldably urge the valve plate 52 into a closed position with respect to the liquid discharge opening 25. Thus, during shipment or storage, the liquid in container 70 cannot leak therefrom. When it is desired to put container 70 in use, the container 70 is inverted. When it is desired to dispense or dose liquid from the container 70, the apparatus 76 is positioned as seen in FIG. 11. When actuator 74 is moved upwardly, the actuator 74 moves the valve plate 52 to its open position so that liquid from the container 70 may flow downwardly through the valve 10.

In summary somewhat, the valve 10 is comprised completely of a plastic material. The valve 10 is comprised of two components, namely the substrate member 12 and the valve member 42. Thus, the valve 10 is constructed so as to utilize less plastic than other valves in the prior art. Further, the valve 10 is easy to manufacture and assemble. The construction of the valve 10 ensures that the valve 10 will function or will be sustainable for a long period of time.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A plastic gravity flow valve for insertion into the throat of an inverted liquid container, comprising:
   a generally cylindrical and vertically disposed plastic substrate member including:
   (a) a lower end and an upper end;
   (b) a vertically disposed and ring-shaped wall member, having an inner side, an outer side, an upper end and a lower end, at said lower end of said substrate member and which defines a liquid discharge opening;
   (c) a horizontally disposed and ring-shaped first lip extending outwardly from said lower end of said wall member;
   (d) a horizontally disposed and ring-shaped second lip extending outwardly from said wall member above said first lip;
   (e) said wall member, said first lip and said second lip being overmolded with a plastic material;
   (f) a plurality of radially spaced-apart retainers secured to said inner side of said substrate member at said upper end of said substrate member;
   said generally cylindrical and vertically disposed plastic substrate member having a plurality of radially spaced-apart first vent openings formed therein above said lower end thereof;
   said generally cylindrical and vertically disposed plastic substrate member having a plurality of radially spaced-apart second vent openings formed therein above said plurality of said first vent openings;
   said outer side of said generally cylindrical and vertically disposed plastic substrate member having an annular recess formed therein which is configured to receive a tamper evident lug ring;
   a plastic valve member having upper and lower ends including:
   (a) a horizontally disposed and disc-shaped valve plate having an upper side and a lower side;
   (b) a horizontally disposed first ring member having an upper side and a lower side;
   (c) said upper side of said valve plate being joined to said lower side of said first ring member;
   (d) a first semi-helical plastic spring having a lower end and an upper end;
   (e) said lower end of said first semi-helical spring being secured to said first ring member;
   (f) a second semi-helical plastic spring having a lower end and an upper end;
   (g) said lower end of said second semi-helical plastic spring being secured to said first ring member;
   (h) said lower ends of said first and second semi-helical springs being secured to said first ring member approximately 180 degrees apart;
   (i) a horizontally disposed second ring member positioned above said first and second semi-helical plastic springs;
   (j) said upper ends of said first and second semi-helical springs being secured to said second ring member approximately 180 degrees apart;
   (k) said retainers being positioned above said second ring member to prevent upward movement of said valve member with respect to said substrate member;
   said valve plate being vertically movably positioned in said plastic substrate member between a lower closed position and an upper open position;
   said valve plate closing said liquid discharge opening in said substrate member when said valve plate is in said lower closed position;
   said liquid discharge opening permitting liquid to flow downwardly therethrough when said valve plate has been moved upwardly to said upper open position; and
   said first and second plastic springs yieldably urging said valve plate downwardly to close said liquid discharge opening in said substrate member.

2. The plastic gravity flow valve of claim 1 wherein each of said first and second vent openings have a rectangular shape.

3. The plastic gravity flow valve of claim 2 wherein said first vent openings are larger than said second vent openings.

4. A plastic gravity flow valve for insertion into the throat of an inverted liquid container, comprising:
   a generally cylindrical and vertically disposed plastic substrate member including:
   (a) a lower end, an upper end; an inner side and an outer side;
   (b) a vertically disposed and ring-shaped wall member, having an inner side, an outer side, an upper end and a lower end, at said lower end of said substrate member and which defines a liquid discharge opening;
   (c) a horizontally disposed and ring-shaped first lip extending outwardly from said lower end of said wall member;
   (d) a horizontally disposed and ring-shaped second lip extending outwardly from said wall member above said first lip;
   (e) said wall member, said first lip and said second lip being overmolded with a plastic material;
   (f) a plurality of radially spaced-apart retainers secured to said inner side of said substrate member at said upper end of said substrate member;
   said generally cylindrical and vertically disposed plastic substrate member having a plurality of radially spaced-apart first vent openings formed therein above said lower end thereof;
   said generally cylindrical and vertically disposed plastic substrate member having a plurality of radially spaced-apart second vent openings formed therein above said plurality of said first vent openings;
   a plastic valve member having upper and lower ends including:
   (a) a horizontally disposed and disc-shaped valve plate having an upper side and a lower side;
   (b) a horizontally disposed first ring member having an upper side and a lower side;
   (e) said upper side of said valve plate being joined to said lower side of said first ring member;
   (d) a first semi-helical plastic spring having a lower end and an upper end;

(e) said lower end of said first semi-helical spring being secured to said first ring member;

(f) a second semi-helical plastic spring having a lower end and an upper end;

(g) said lower end of said second semi-helical plastic spring being secured to said first ring member;

(h) said lower ends of said first and second semi-helical springs being secured to said first ring member approximately 180 degrees apart;

(i) a horizontally disposed second ring member positioned above said first and second semi-helical plastic springs;

(j) said upper ends of said first and second semi-helical springs being secured to said second ring member approximately 180 degrees apart;

(k) said retainers being positioned above said second ring member to prevent upward movement of said valve member with respect to said substrate member;

said valve plate being vertically movably positioned in said plastic substrate member between a lower closed position and an upper open position;

said valve plate closing said liquid discharge opening in said substrate member when said valve plate is in said lower closed position;

said liquid discharge opening permitting liquid to flow downwardly therethrough when said valve plate has been moved upwardly to said upper open position; and said first and second plastic springs yieldably urging said valve plate downwardly to close said liquid discharge opening in said substrate member.

5. The plastic gravity flow valve of claim 4 wherein each of said first and second vent openings have a rectangular shape.

6. The plastic gravity flow valve of claim 4 wherein said first vent openings are larger than said second vent openings.

7. The plastic gravity flow valve of claim 4 wherein said outer side of said generally cylindrical and vertically disposed plastic substrate member has an annular recess formed therein which is configured to receive a tamper evident lug ring.

\* \* \* \* \*